United States Patent [19]
Mitsui et al.

[11] 4,001,185
[45] Jan. 4, 1977

[54] ACCELERATION SENSING DEVICE

[75] Inventors: Tatsuo Mitsui, Hirakata; Okihiko Nakano, Katano; Itaru Mitsugi, Kadoma, all of Japan

[73] Assignee: Matsushita Electric Industrial Company, Ltd., Osaka, Japan

[22] Filed: June 18, 1973

[21] Appl. No.: 370,637

[30] Foreign Application Priority Data

| | | |
|---|---|---|
| June 28, 1972 | Japan | 47-65274 |
| July 20, 1972 | Japan | 47-86117[U] |
| July 31, 1972 | Japan | 47-90743[U] |
| Aug. 18, 1972 | Japan | 47-96900[U] |
| Aug. 22, 1972 | Japan | 47-98351[U] |
| Nov. 10, 1972 | Japan | 47-130227[U] |
| Nov. 10, 1972 | Japan | 47-130228[U] |
| Jan. 20, 1973 | Japan | 48-9511[U] |
| Feb. 19, 1973 | Japan | 48-21437[U] |
| Feb. 23, 1973 | Japan | 48-23748[U] |
| May 18, 1973 | Japan | 48-58929[U] |

[52] U.S. Cl. .............. 200/61.45 R; 200/61.45 M; 200/61.52; 200/DIG. 29; 200/277
[51] Int. Cl.² ................. H01H 35/14; H01H 1/16
[58] Field of Search ............... 200/61.45 R, 61.53, 200/DIG. 29, 166 BB, 277; 317/101 C, 101 CM, 101 CC

[56] References Cited
UNITED STATES PATENTS

| | | | |
|---|---|---|---|
| 1,662,979 | 3/1928 | Nelson | 200/DIG. 29 |
| 2,182,300 | 12/1939 | McCandless | 200/61.52 |
| 2,415,086 | 2/1947 | Detwiler | 200/61.52 |
| 2,721,237 | 10/1955 | Yunker | 200/61.49 |
| 2,892,049 | 6/1959 | Rubinstein | 200/61.52 X |
| 2,898,415 | 8/1959 | Clurman | 200/61.52 X |
| 2,926,223 | 2/1960 | Netterfield | 200/61.52 |
| 2,950,365 | 8/1960 | Bolstad | 200/61.52 |
| 3,339,117 | 8/1967 | Fisher | 317/101 C |
| 3,508,019 | 4/1970 | Crockett | 200/61.52 X |
| 3,527,907 | 9/1970 | Schwab | 200/61.45 R UX |
| 3,619,524 | 11/1971 | Gillund | 200/61.45 M |
| 3,757,266 | 9/1973 | Newman et al. | 200/166 BB X |

*Primary Examiner* — James R. Scott
*Attorney, Agent, or Firm* — Stevens, Davis, Miller & Mosher

[57] ABSTRACT

An acceleration sensing device comprising an electrically conductive annular conductive support ring, an electrically conductive sphere to be placed on the upper inner periphery of said support ring, and an electrically conductive contact disposed in the neighborhood of said ball, thereby the device being capable of detecting acceleration in any direction by the use of the electrical conduction between the support ring and the contact through the ball.

23 Claims, 51 Drawing Figures

ACCELERATION SENSING DEVICE

This invention relates to an acceleration sensing device for sensing acceleration above a certain magnitude, and more particularly to an acceleration sensing device to be installed in an automobile for sensing large accelerations which may be applied upon a rear-end or head-on collision and activating a safety means for the passengers, and to one to be installed in an industrial machine for sensing earthquakes of magnitudes above a certain value and activating a safety means for turning off power sources, fuel sources, etc. to prevent electrical shocks, fires, explosions, etc.

A conventional acceleration sensing device used in airplanes, etc. comprises three components; a weight, a resilient member for supporting this weight, and a housing. The device detects the acceleration by the displacement of said weight. In the case of detecting an impact acceleration in such a structure, it takes some length of time for the weight to achieve a certain displacement. This time lag is a large drawback in the case of controlling another machine by the detection of acceleration. Further, the restricting force of the resilient member for the weight may vary one by one due to the variations in treatment, internal strains, time-dependent deteriorations of mechanical properties, etc. and increase the detection error. Further, said conventional acceleration sensing device has a drawback that acceleration only in a particular direction can be detected.

This invention is intended to eliminate said conventional drawbacks.

An object of this invention is to provide an acceleration sensing device capable of detecting acceleration in any direction. When one unit can detect acceleration in any direction, the electrical circuits and the structure of the safety means can be simplified to a large extent.

Another object of this invention is to provide an acceleration sensing device having a rapid response speed, i.e., the time length from the application of an acceleration to the activation of a safety device.

A further object of this invention is to provide an acceleration sensing device having a simple and compact structure.

According to an embodiment of the present invention, there is provided an acceleration sensing device comprising an annular support ring formed of an electrically conductive material, an electrically conductive sphere placed on the upper inner periphery of said support ring, and an electrically conductive contact member disposed in the neighborhood of said conductive sphere, thereby detecting the acceleration by sensing one of the electrical conduction or the non-conduction between said support ring and said contact member due to the contact and separation of said conductive sphere and said contact member upon the application of an acceleration.

According to the present invention as described above, the following effects can be provided:

1. An acceleration in an arbitrary direction of the three dimensional space including the horizontal and vertical directions (not only a predetermined direction) can be detected.
2. The response speed is rapid.
3. The structure becomes simple and compact.

Other objects, features and advantages of the present invention will become apparent from the detailed description when taken in conjunction with the accompanying drawings in which.

Figure 15:
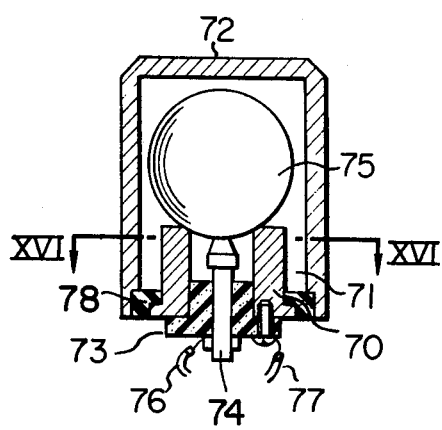
Figure 16:
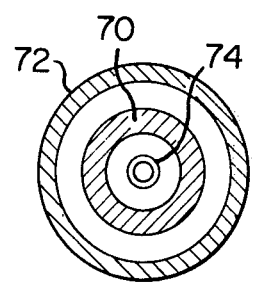
Figure 17:
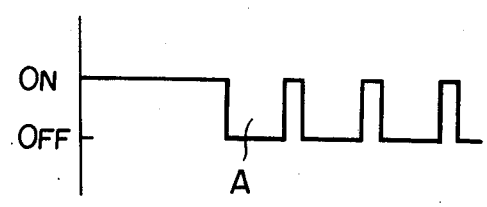
Figure 18:
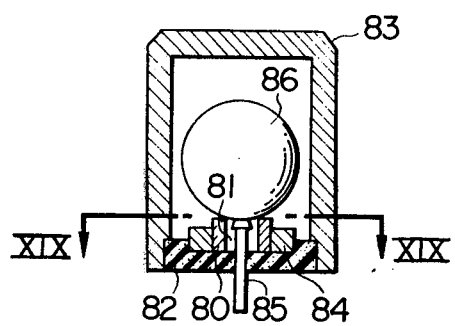
Figure 19:
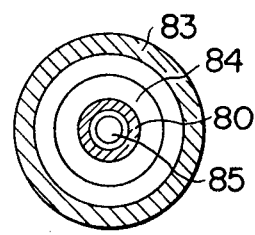
Figure 20:
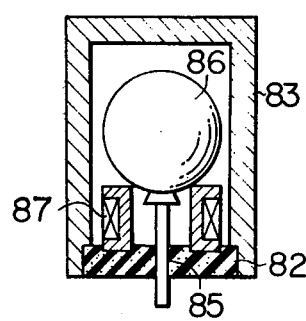
Figure 21:
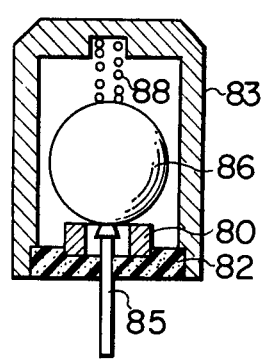
Figure 22:
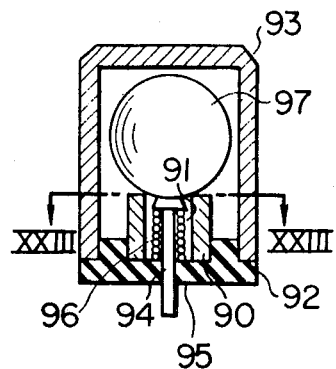
Figure 23:
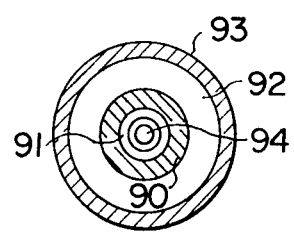
Figure 24:
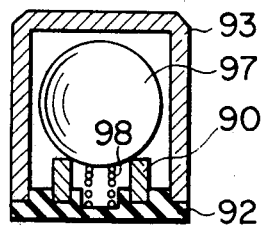
Figure 25:
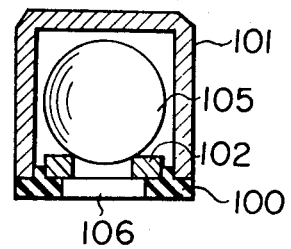
Figure 26:
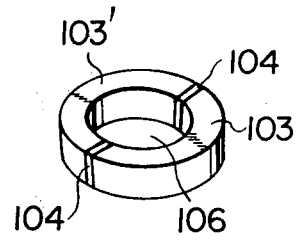
Figure 27:
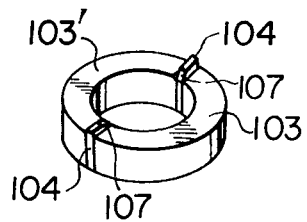
Figure 28:
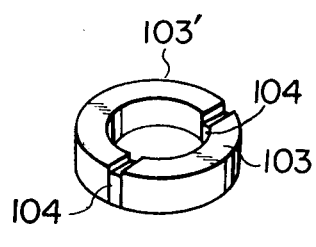
Figure 29:
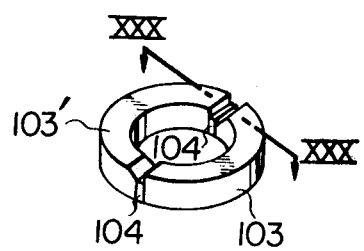
Figure 30:
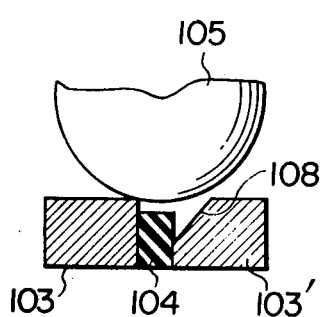
Figure 31:
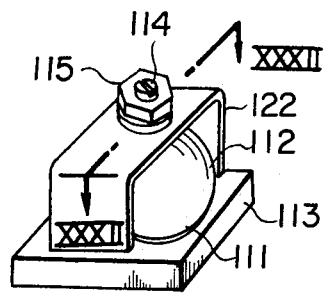
Figure 32:
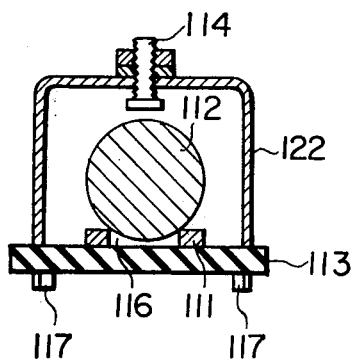
Figure 33:
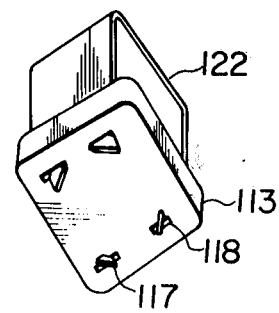
Figure 36:
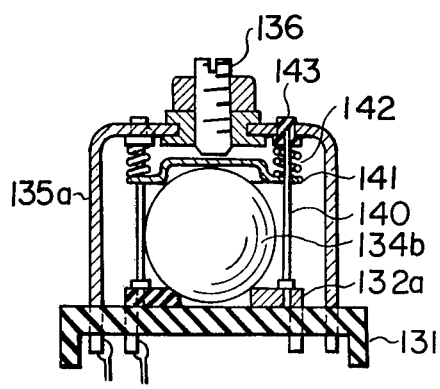
Figure 37:
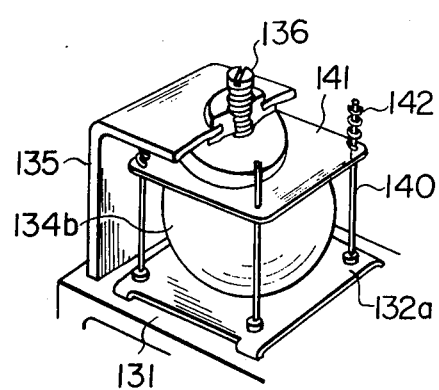
Figure 38:
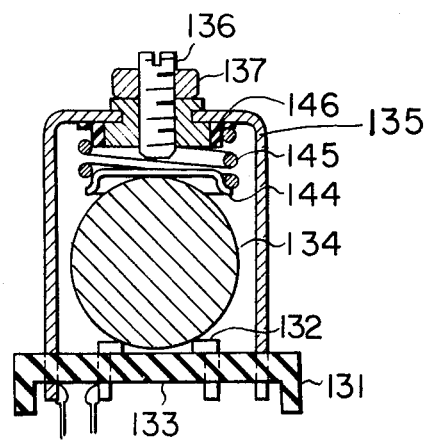
Figure 39:
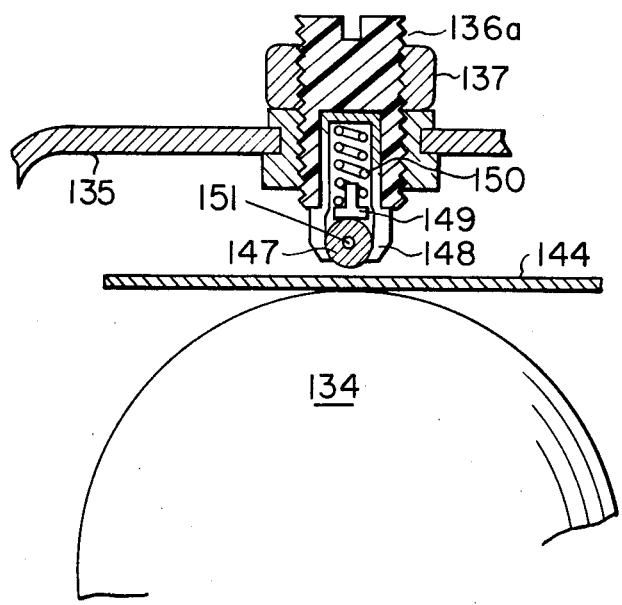
Figure 40A:
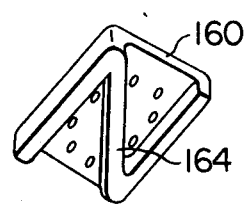
Figure 40B:
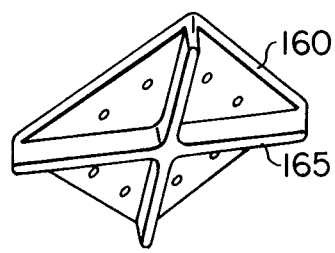
Figure 40C:
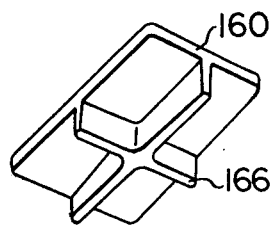
Figure 40D:
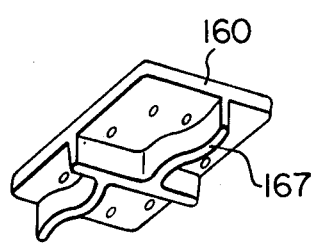
Figure 40E:
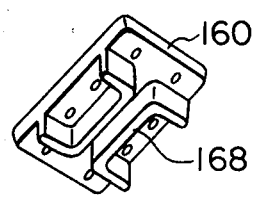
Figure 41:
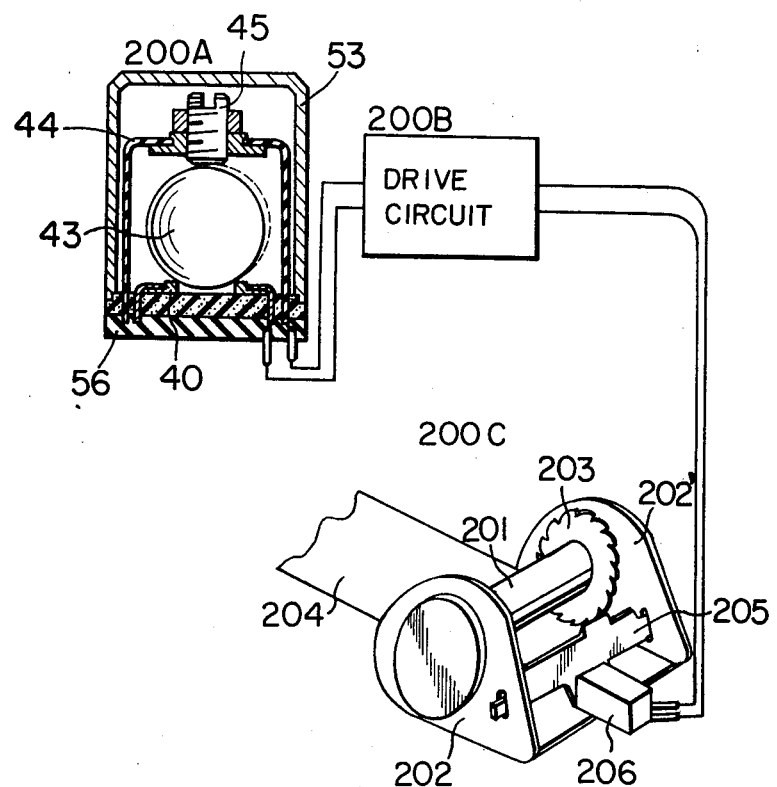
Figure 42:
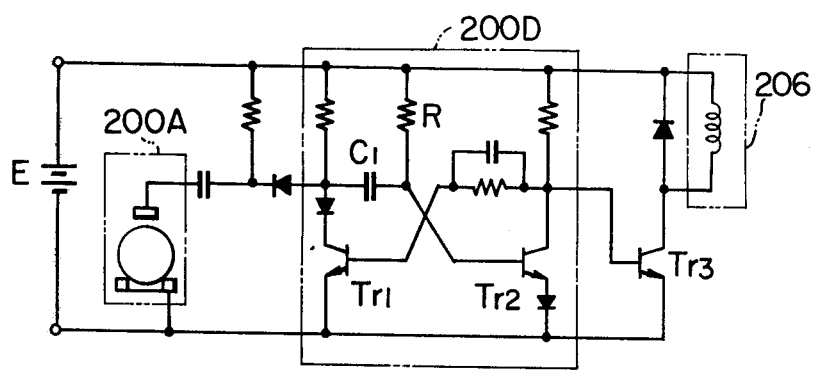
Figure 43A:
Figure 43B:
Figure 44:
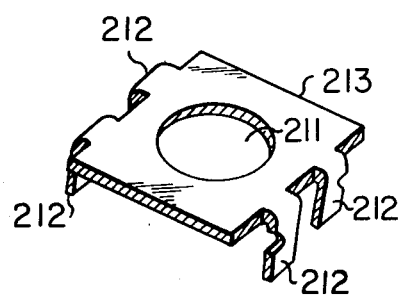
Figure 45:
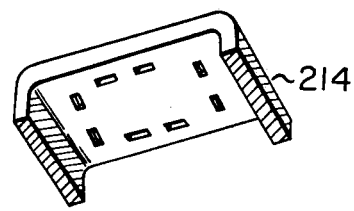
Figure 46:
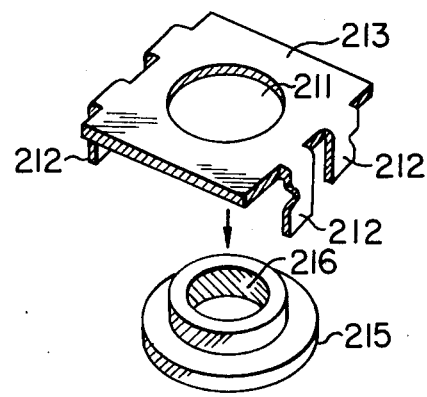

FIGS. 12, 13, 14, and 15 are cross-sections of other embodiments of the acceleration sensing device according to this invention;

FIG. 16 is a cross-section of the device of FIG. 15 along the line XVI — XVI;

FIG. 17 shows an output signal waveform of the device of FIG. 15;

FIG. 18 is a cross-section of another embodiment of the acceleration sensing device according to this invention;

FIG. 19 is a cross-section of the device of FIG. 18 along the line XIX — XIX;

FIGS. 20, 21 and 22 are cross-sections of other embodiments of the acceleration sensing device according to this invention;

FIG. 23 is a cross-section of the device of FIG. 22 along the line XXIII — XXIII;

FIG. 24 is a cross-section of a modification of the device of FIG. 22;

FIG. 25 is a cross-section of another embodiment of the acceleration sensing device according to this invention;

FIG. 26 is a perspective view of the support ring for the device of FIG. 25;

FIGS. 27, 28 and 29 are perspective views of other embodiments of the support ring shown in FIG. 26;

FIG. 30 is a cross-section of the ring of FIG. 29 along the line XXX — XXX;

FIG. 31 is a perspective view of another embodiment of the acceleration sensing device according to this invention;

FIG. 32 is a longitudinal cross-section of the device of FIG. 31 along the line XXXII — XXXII;

FIG. 33 is a perspective view of the device of FIG. 31 seen from the bottom;

FIGS. 34, 35, 36 and 38 are cross-sections of other embodiments of the acceleration sensing device according to this invention;

FIG. 37 is partially cut-away perspective view of the device of FIG. 36;

FIG. 39 is a partial cross-section of a modification of the device of FIG. 38;

FIGS. 40a to 40e are perspective views of examples of the insulating substrate for the acceleration sensing device according to this invention;

FIG. 41 is a schematic diagram of a safety belt locking system for an automobile using the acceleration sensing device of this invention;

FIG. 42 is an electric circuit diagram of the system of FIG. 41;

FIGS. 43a and 43b show signal waveforms for illustrating the operation of the electric circuit of FIG. 42; and FIGS. 44 and 45 to 46 are perspective views of other embodiments of the support ring assembly for the acceleration sensing device of this invention.

Before the description of the embodiments of this invention, typical examples of the conventional acceleration sensing device will be described briefly referring to FIGS. 1 and 2.

Figure 1:
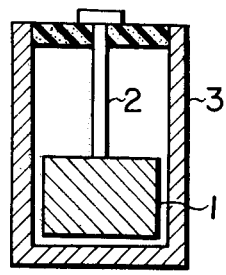
FIGS. 1 and 2 are cross-sections of conventional acceleration sensing devices, respectively.
Figure 2:
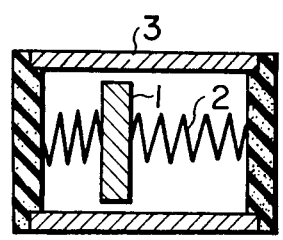

FIGS. 1 and 2 show basic conventional structures of acceleration sensing devices both of which comprise a weight 1, a resilient member 2 for supporting this weight 1, and a housing 3 for containing these elements and detecting the magnitude of displacement of said weight 1 caused by the force applied to said weight 1 to detect acceleration. Various drawbacks as described before accompany the use of the resilient member.

Hereinbelow, the embodiments of the present invention will be described referring to the drawings.

Figure 3:
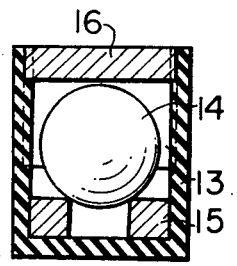
FIG. 3 is a cross-section of an embodiment of an acceleration sensing device according to this invention.

FIG. 3 shows the first embodiment of the acceleration sensing device of this invention, which comprises a housing 13 formed of an insulating material, an electrically conductive support ring 15 fixed on the bottom of said housing 13, an electrically conductive sphere 14 placed on the upper inner periphery of this support ring, and an electrically conductive contact member 16 covering the aperture of the housing 13. The contact member 16 is screwed into the threads formed in the inner surface of said housing 13. FIG. 3 shows the state under no acceleration. In this case, the conductive sphere 14 and the contact member 16 do not contact each other and hence the support ring 15 and the contact member 16 are electrically cut off.

Figure 4:
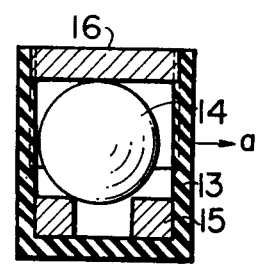
FIG. 4 is a cross-section of the device of FIG. 3 but applied with an acceleration.

When an acceleration $a$ as written by the formula $$a > g.r / \sqrt{R^2 - r^2}$$

is applied to the sphere, where R and r are the radii of the sphere 14 and the aperture of the support ring 15 and g is the gravitational acceleration, the sphere 14 moves about a point on the upper inner periphery of the support ring 15 and contacts the contact member 16 as is shown in FIG. 4. This contact between the sphere 14 and the contact member 16 can be detected as an electrical conduction between the support ring 15 and the contact member 16 for use as an acceleration detection. In this acceleration detection, the least magnitude of acceleration to be detected can be set by selecting the radius of the aperture of the support ring 15. Further, the response speed can be easily selected by adjusting the gap between the contact member 16 and the sphere 14 through the adjustment of the contact member 16.

If an acceleration is an impact in a short time period, the sphere 14 contacts the contact member 16 in a collision, repeats several bounces and then rests still. In this case, it is necessary to detect the first collision between the contact member 16 and the sphere 14 as the electrical conduction between the member 16 and the support ring 15 to detect the acceleration.

Figure 5:
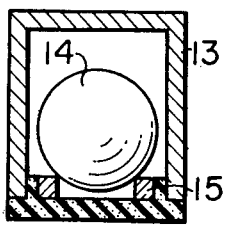
FIGS. 5, 6 and 7 are cross-sections of other embodiments according to this invention.
Figure 6:
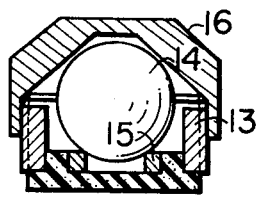

When the response speed is of less importance, those devices as shown in FIGS. 5 and 6 which detect acceleration through the contact between a sphere 14 and the inner wall of an electrically conductive housing 13 are also effective. The devices shown in FIGS. 5 and 6 are provided with insulative substrates 17.

Figure 7:
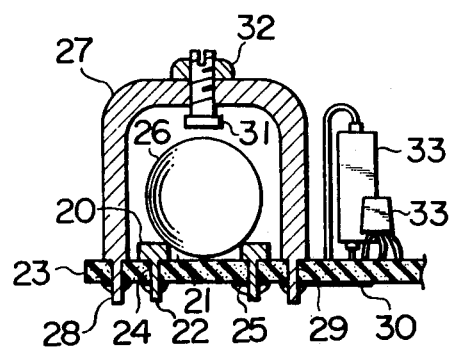
Figure 8:
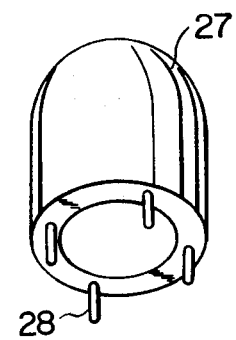
FIGS. 8 and 9 are perspective views of the case and the support ring of the device of FIG. 7.
Figure 9:
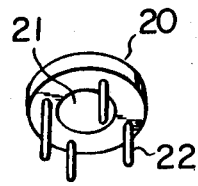

FIGS. 7 to 9 show another embodiment of the acceleration sensing device. In the figures, a conductive support ring 20 has a through hole 21 and is provided with unitary terminals 22 on the lower surface. The terminals 22 are inserted into the holes 24 in a printed board 23 and soldered with conductive pattern 25 formed of the lower surface of the printed board 23. A conductive sphere 26 has a diameter larger than that of the aperture 21 of said support ring 20 and is placed on the upper inner periphery of the hole 21 of said support ring 20. A conductive casing 27 has a vessel shape as shown in the figure and an open end provided with unitary terminals 28. These terminals 28 are inserted into respective holes 29 in the printed board 23 and soldered with a conductive pattern 30 provided on the lower surface of the printed board 23 as is shown in FIG. 7. A conductive contact member 31 is screwed into the upper part of said casing 27 and supported thereat. The lower surface of this contact member 31 is disposed above said sphere 26 with a predetermined gap therebetween. Said contact member 31 is fixed to the casing 27 with a locking nut 32. Electronic parts 33 are connected to and mounted on said printed board 23.

When an acceleration expressed by $$a > g.r / \sqrt{R^2 - r^2}$$

where, g is the gravitational acceleration, and R and r are respective radii of the sphere 26 and the aperture 21 of the support ring 20, is applied in a horizontal direction the sphere 26 moves about a point on the upper inner periphery of the support ring 20, contacts the contact member 31 and allows the electrical conduction between the conductive support ring 20 and the conductive casing 27 therethrough. The contact between the sphere 26 and the contact member 31 can be electrically detected as a voltage drop of the voltage applied between the support ring 20 and the contact member 31. Here, if the acceleration applied to the device is an impact, the sphere 26 repeats several bounces against the contact member 31. In this case, the first contact should be detected in the acceleration detection.

Figure 10:
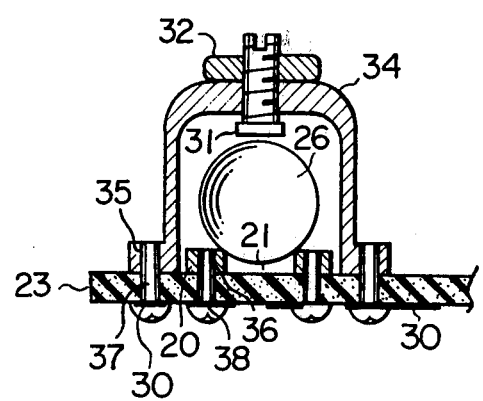
FIG. 10 is a cross-section of another embodiment of this invention.
Figure 11:
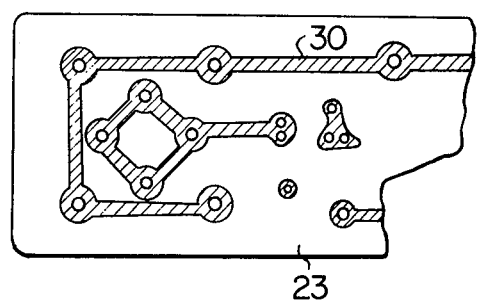
FIG. 11 is a partial bottom view of the device of FIG. 7 or FIG. 10.

FIGS. 10 and 11 show another embodiment of the acceleration sensing device. In this embodiment, screw threads 35 are formed in the open end portion of a housing 34 and similer screw threads 36 are formed in a support ring 20. The support ring 20 and the housing 34 are fixed on a printed board 23 by screws 37 and 38 using said threads 35 and 36. In this case, the electrical conduction between conductive patterns 30 formed on the printed board 23, the support ring 20 and the housing 34 is obtained through the screws 38 and 37, respectively. FIG. 11 shows the lower surface of the printed board 23 of the embodiment shown in FIG. 10.

According to the above embodiments, there can be provided the following effects:

An acceleration in any horizontal direction can be detected;

The structure is simple and hence can be made compact; and

The structure can be easily assembled by screws or soldering terminals on a printed board and the electrical conduction with a conductive pattern can be provided simultaneously with the assembly.

FIG. 44 shows an example of the support ring for the present acceleration sensing device. A conductive plate is punched to form a hole 211 and projections 212. These projections 212 are bent downward. Thus a support ring 213 can be formed simply. In attaching this support ring 213 to an insulating substrate 214 shown in FIG. 45, the projections 212 of the support ring 213 are inserted into holes formed in the insulating substrate 214 and then bent on the lower surface of the substrate 214 to fix it. In the case of punching the support ring 213 by a press machine, a ring body 215 having a step portion as shown in FIG. 46 may be formed separately. In this case, the ring body 215 is fixed on the substrate 214 by the support ring 213 shown in FIG. 44. A sphere is placed on the upper inner periphery of the hole 216 of the ring body 215.

Figure 13:
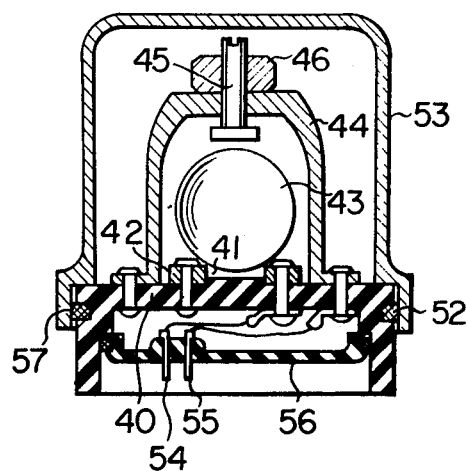

FIG. 41 shows schematically a safety belt locking system for an automobile using the present acceleration sensing device. The system comprises an acceleration sensing device 200 A by way of example as shown in FIG. 13, a drive circuit 200 B, and a safety belt locking system 200 C. First, the safety belt locking system 200 C will be described.

In the figure, an automatic reel drum 201 is rotatively supported between side plates 202 and 202'. A ratchet wheel 203 is fixed to this reel drum. A seat belt 204 is coiled on said reel drum 201 and usually subjected to a winding force about the drum 201 by a resilient member provided in said automatic reel drum 201. This seat belt 204 is provided to restrain a passenger of an automobile, but is usually freely pulled out and in. A pawl 205 is rotatively supported between said side plates 202 and 202'. A solenoid 206 is provided to drive said ratchet pawl 205.

FIG. 42 shows the electric circuit for said safety belt locking system, which includes a monostable multivibrator 200 D constituting the driving circuit 200 B of FIG. 41, a switching transistor $Tr_3$, and a battery E. The operation of said safety belt locking system will be described.

When a passenger sits on a seat in an automobile and winds a safety belt around his body, a sphere 43 in said acceleration sensing device rests still on a support ring 40 if the automobile is at a standstill or is run at a constant speed. In such a case, the sphere 43 and the contact member 45 are electrically cut off. Thus, transistors $Tr_1$ and $Tr_2$ constituting the monostable multivibrator 200 D and the transistor $Tr_3$ are kept off, on and off respectively and hence no current is allowed to flow through the solenoid 206. Therefore, the ratchet pawl 205 and the ratchet 203 of the reel drum 201 do not engage with each other. Therefore, the seat belt is freely drawn or pulled back and the passenger does not feel a restraining force from the safety belt 204.

If the automobile is applied with an emergency brake or collides with something and is applied with an impact acceleration, the sphere 43 moves on the support ring 40 as is shown by the dotted line in FIG. 41. Then, the sphere 43 contacts the contact member 43 several times, and the contact member 43 and the support ring 40 are intermittently driven into conductive state through the sphere 43 as is shown in FIG. 43a. Hence, the monostable multivibrator 200 D is reversed for a period determined by the capacitance $C_1$ and the resistance R and the transistors $Tr_1$, $Tr_2$ and $Tr_3$ are turned on, off and on respectively. Thus, a current is allowed to flow through the solenoid 206 as is shown in FIG. 43b. Thereby, the ratchet pawl 205 is driven by the solenoid 206 to engage with the ratchet 203. Therefore, the safety belt 204 is locked and prevented from being drawn out and hence restrains the passenger to the seat.

FIGS. 31 and 32 show another embodiment of the acceleration sensing device, in which a conductive support ring 111 having a hole 116 is fixed on an insulating substrate 113 and a conductive sphere 112 is set on the upper inner periphery of the aperture 116. A U-shaped conductive plate 122 is formed by bending a metal plate and provided with unitary projections 117. These projections 117 are inserted into the holes 118 formed in said insulating substrate 113 and then bent on the lower surface of the insulating substrate 113 to fix the conductive plate 122 to the insulating substrate 113 as is shown in FIG. 33. A contact member 114 is supported by said conductive plate 122 and fixed by a locking nut 115 to prevent the relative motion of the contact member 114 due to vibrations, etc.

Figure 34:
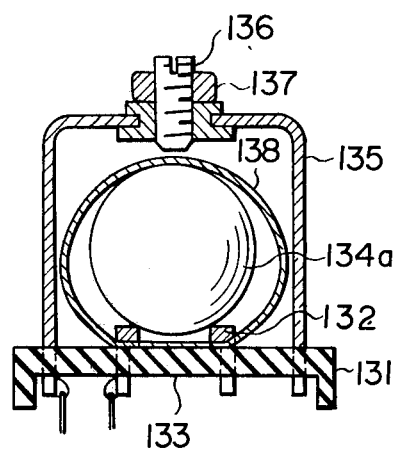

FIG. 34 shows another embodiment in which an elongated contact ribbon 138 having a resilience is warped in a circle-like shape and has the both ends fixed to a support ring 132. A sphere 134a is put in this circle so that the top of this sphere contact the central portion of the contact ribbon 138. Namely, in the absence of the sphere, the height of the contact ribbon 138 is arranged smaller than that of the sphere 134a. Thus, when the sphere 134a is inserted, the contact ribbon 138 depresses the sphere 134a downward with a minute force by the resilience of the contact ribbon 138. The contact ribbon 138 and the sphere 134a are thereby always driven to mutual contact. If the top of the sphere 134a is displaced in any movement of the sphere 134a, the contact ribbon 138 is also displaced upward or downward. Therefore, if the sphere 134a is moved by an acceleration a, the contact ribbon 138 is lifted upward to contact the contact member 136. The contact ribbon 138 moves vertically in parallel sense and hence the contact portion with the contact member 136 becomes a line or plane, theoretically. Thus, the contact area increases extremely. In this structure, since the contact ribbon 138 is directly connected with the support ring 132 and the electrical conduction is achieved through the support ring 132, the contact ribbon 138 and the contact member 136, the sphere 134a may not be conductive.

Figure 35:
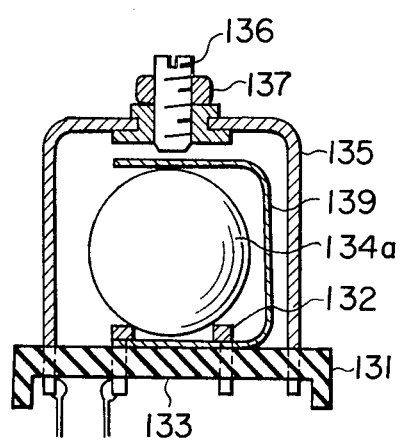

FIG. 35 shows another embodiment in which a conductive plate 139 is fixed at one end to enhance the movement of a sphere 134a. In the structure of FIG. 34, the force constant of the contact plate 138 may become fairly large from its structure and apply, an excess force to the sphere 134a to increase variations of the detected accelerations, whereas in the structure of FIG. 35, the contact plate 139 is supported only at one end and hence can have a small force constant to considerably depress variations of the detected accelerations.

FIGS. 36 and 37 show another embodiment in which a plurality of guide pins 140 is provided to a support ring 132a and a contact plate 141 is provided movable along the guide pins 140 in the vertical direction and is applied with a downward force by coil springs 142. Insulating bushings 143 are formed on the frame 135 for supporting the upper end of said guide pins 140. Electrically, a current may be allowed to flow from the support ring 132a through the guide pins 140 to the contact plate 141, or from the support ring 132a through the sphere 134b to the contact plate 141. In the former case, the sphere 134b may not be conductive as in the cases of FIGS. 34 and 35, but it should be conductive in the latter case. Further, the sphere 134b and the contact plate 141 contact each other in a point contact. But since they are always contacted, there is little possibility of poor conduction.

FIG. 38 shows another embodiment in which a contact plate 144 provided on a conductive sphere 134 is pressed downward by a coiled spring 145. An insulating bushing 146 is provided at the seat of the spring 145 to achieve insulation from the contact 136 and the frame 135. According to this embodiment the diameter of the coiled spring 145 can be selected large and hence the force constant can be selected very small to decrease the depressing force for the sphere 134 and thereby to minimize the variation of the detected acceleration.

FIG. 39 shows another embodiment in which a roller 147 is depressed downward by a coiled spring 150 and a seat 149 and partially projects from the aperture of a housing 148 to contact a contact plate 144. The open end of the housing 148 is arranged by tapering the top portion, etc. not to drop the roller 147. The roller 147 is bearing on an axis 151 around which the roller is rotatable. The axis 151 is vertically slidably mounted against the spring 150 in the housing. The housing 148 is pressed into a screw 136a. Said roller 147, coiled spring 150, housing 148 and screw 136a should be conductive. By the contact of the contact plate 144 with the roller 147, the roller 147 rotates and a new contact portion appears successively. If the contact plate 144 moves purely vertically, the roller 147 does not rotate. If, however, the direction of the force of the coiled spring 150 is off-set from the center line of the roller 147, the rotation of the roller 147 is relatively easily provided.

Figure 12:
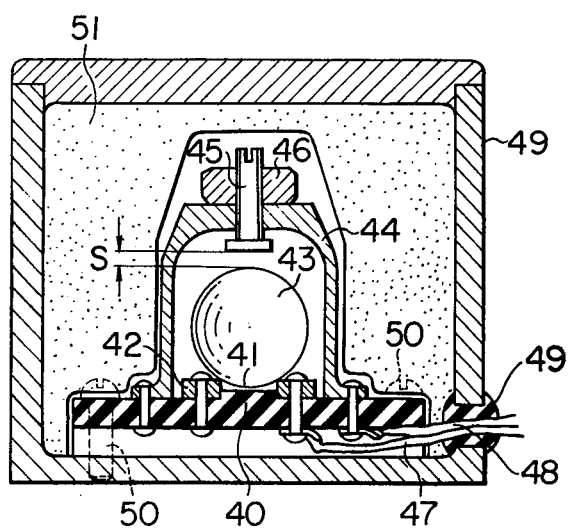

FIG. 12 shows another embodiment in which a conductive support ring 42 having a hole 41 is fixed on the upper surface of an insulating substrate 40. A conductive sphere 43 having a diameter larger than that of the hole 41 of the support ring 42 is placed on the upper inner periphery of said support ring 42. A conductive housing 44 is fixed on said insulating substrate 40 and covers said sphere 43 and said support ring 42. A contact member 45 is screwed into and supported by the upper portion of the housing 44. A locking nut 46 fastens said contact member 45. A lead-wire 47 is electrically connected with said support ring 42 and another lead-wire 48 is electrically connected with said housing 44. The insulating substrate 40 is fixed to and in an outer casing 49 by screws 50. The outside of the housing 44 is molded with a resin 51 which has a relatively high thermoinsulation power.

When an acceleration $a$ expressed by $$a > g \cdot r / \sqrt{R^2 - r^2}$$

where, $g$ is the gravitational acceleration and R and r are the respective radii of the sphere 43 and the hole 41 of the support ring 42, is applied in a horizontal direction, the sphere 43 moves about a point on the periphery of the hole 41 of the support ring 42 and contacts the contact member 45. Then, the lead-wires 47 and 48 are taken out from the housing 49 through an insulative grommet 49' and are electrically connected to detect the acceleration. In the above embodiment, it is necessary for decreasing the response time to decrease the gap S between the sphere 43 and the contact member 45. When the gap S is made small, however, upon a rapid change of the ambient temperature usually the housing 44 is first subjected to an expansion or contraction and then the parts inside the housing 44 such as the sphere 43 is subjected to a similar change. Thus, the gap S is subjected to a change which causes a change in the response speed. In the embodiment shown in FIG. 12, since a resin 51 of high thermal insulation is disposed around the housing 44, changes of the response speed of the total system due to temperature changes are prevented and the acceleration can be rapidly and correctly sensed.

FIG. 13 shows another embodiment, in which the inside of a casing is evacuated to enhance the thermal insulation. An outer casing 53 is fitted to an insulating substrate 40 through a seal 52 and a bottom cover 56 provided with terminals 54 and 55 is fitted to the insulating substrate 40 through another seal 57. The inside of the outer casings 53 and 56 is evacuated to improve the thermal insulation.

Here, the inside of the outer casing 53 and 56 may alternatively be filled with a gas of high thermal insulation.

Figure 14:
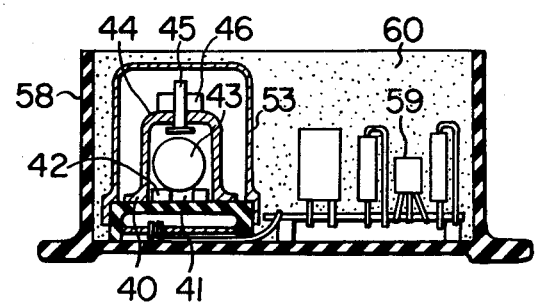

FIG. 14 shows another embodiment in which an acceleration sensing mechanism and acceleration sensing circuit parts 59 are enclosed in a casing 58 and unitarily molded in a resin 60.

According to the above embodiments, there can be provided the following advantages:

An acceleration in any horizontal direction can be sensed;

The structure is simple, does not need manufacturing precision and hence can be manufactured at a low cost;

The response time does not change even against a rapid temperature change and hence the acceleration can be sensed correctly;

The system can be used in a wide range of temperature;

A compact acceleration sensing device can be provided.

In the embodiment of FIG. 14, in molding the acceleration sensing device in the casing 58 with the resin 60 such as epoxy or silicone resin, it may happen that internal stress appears due to the thermal contraction in setting the resin 60 and the insulating substrate 40 may be bent concave due to this stress. It is effective for preventing this bending to form a supporting rib 164, 165, 166, 167 or 168 as shown in FIGS. 40a to 40e on the lower surface of the insulating substrate 40.

FIGS. 15 and 16 show another embodiment in which a conductive ring 70 having a hole 71 is fixed to the open bottom end of a housing 72. An insulating bushing 73 and insulating ring 78 are fitted and fixed to the hole 71 of said support ring 70. A conductive contact rod 74 is fixed to this insulating bushing 73. This contact rod 74 is disposed at the center line of said support ring in a manner that the top thereof is located lower than the upper end surface of said support ring 70. A conductive sphere 75 is mounted on the upper inner periphery of said support ring and contacts the top of said contact rod 74 when it is at rest. Lead-out wires 76 and 77 are connected to said contact rod 74 and said support ring 70, respectively. Thus, an electrical circuit is formed through the lead wire 76, the contact rod 74, the conductive sphere 75, the support ring 70 and the lead wire 77 when the sphere is at rest. When an acceleration $a$ expressed by $$a > g \cdot r / \sqrt{R^2 - r^2}$$

where, g is the gravitational acceleration and R and r are the radii of the sphere 75 and the hole 71 of the support ring 70 respectively, is applied in a horizontal direction, the sphere begins to move in the direction of the acceleration and departs from the contact rod 74 to open the electrical circuit.

When an acceleration as described above is applied to the system, the sphere 75 is allowed to separate from the contact rod 74 momentarily. If the acceleration is an impact, however, the sphere 75 is held by the inner wall of the housing 72, or returned by gravity which brings back the sphere onto the support ring 70. The sphere 75 repeats such an action and performs a damped oscillation. The electrical conduction in such a damped oscillation is as shown by the waveform of FIG. 17.

Referring to FIG. 17, if the first waveform A is differentiated to detect the rising, the response speed can be depressed less than 1 msec. including the retardation due to the electrical circuit. The least acceleration to be detected can be selected at an arbitrary value by selecting the relative value of the radii of the sphere 75 and the hole 71 of the support ring 70, R and r appearing in the above formula. In the embodiment of FIG. 15, it can be achieved only by altering the radius of sphere 75 to make it smaller or greater and adjusting the position of the contact rod 74 by adjusting the screw.

The above embodiment provides the following advantages:

An acceleration in any three dimensional direction including the horizontal and vertical directions (not only an acceleration in a particular direction) can be sensed;

The response speed is high;

The structure is simple and hence can be made compact;

Detection errors due to variations of the resilient member and the time-dependent mechanical deteriorations can be minimized due to the elimination of any resilient member such as a spring.

FIGS. 18 and 19 show another embodiment, in which a conductive support ring 80 having a hole 81 is supported by an insulating bushing 82 at the lower end and surrounded by a ring-shaped permanent magnet 84. The insulating bushing 82 covers the open lower end of a housing 83. A conductive contact rod 85 is supported by the insulating bushing 82 at the central axis of the support ring 80. The top of the contact rod 85 is located lower than the upper end of said support ring 80. A conductive rigid sphere 86 is placed on the upper inner periphery of said support ring 80. The sphere 86 contacts the top of said contact rod 85 when it is at rest.

As is apparent, when the sphere 86 is at rest on the support ring 80, the support ring 80 and the contact rod 85 are electrically connected through the sphere 86. The sphere 86 is attracted onto the support ring 80 by the magnetic attraction from the magnet 84 as well as by gravity. When the system is subjected to an acceleration $a$ expressed by $$a > \frac{(mg + F)}{m} \cdot \frac{r}{\sqrt{R^2 - r^2}}$$

where, $m$ is the mass of the sphere 86, $g$ is the gravitational acceleration, F is the magnetic attraction working between the sphere 86 and the magnet 84, and R and r are the radii of the sphere 86 and the hole 81 of the support ring 80, the sphere 86 is allowed to depart from the contact rod 85 to cut off the electrical conduction between the rod 85 and the ring 80.

According to this embodiment in which the sphere 86 is attracted not only by gravity but also by the permanent magnet 84, when the system is tilted, errors of the acceleration detection are small compared to the conventional examples and the contact between the sphere 86 and the contact rod 85 is stable.

Here, the least acceleration to be sensed can be freely set by changing the radii of the sphere 86 and the hole 81 of the support ring 80.

Further, the detection of an acceleration is done through the cut-off of the electrical conduction between the contact rod 85 and the support ring 80. When an impact acceleration is applied, the sphere 86 repeats several bounces and then rests on the support ring 80 due to the repulsion from the housing 83, the gravity of the sphere 86 itself, and the attraction from the permanent magnet 84. Thus, the electrical conduction is interrupted several times. It is necessary to detect the first cut-off of the electrical conduction for sensing the acceleration.

FIG. 20 shows another embodiment, in which an electromagnet 87 is used in place of the permanent magnet 84 of the system of FIG. 18. In this embodiment, the electromagnet core is made of a conductive material and works also as the support ring. This embodiment works perfectly similarly to the foregoing embodiment.

FIG. 21 shows another embodiment, in which the sphere 86 is depressed downward by a compression spring 88 instead of the magnetic attraction in the foregoing embodiments. This embodiment works also similarly to the foregoing embodiments.

The above embodiments provide the following advantages:

An acceleration in any three dimensional direction including the horizontal and the vertical direction;

The response speed is high;

The structure is simple and can be made compact;

Since the sphere is applied with a downward force by a permanent magnet, an electromagnet, or a spring, errors in acceleration detection are small even when the system is tilted;

The contact between the sphere and the contact rod is stable.

FIGS. 22 and 23 show another embodiment. In the figures, a conductive support ring 90 having a hole 91 is supported by an insulating bushing 92 which covers the open lower end of a housing 93 and slidably supports a conductive contact rod 94 in a hole 95 formed in the bushing 92. A spring 96 pushes up the contact rod 94 always with a very small amount of force. A conductive sphere 97 is placed on the upper inner periphery of said support ring 90. When this sphere 97 rests still, it depresses said contact rod 94 downward.

When the sphere 97 is at rest on the support ring 90, the support ring 90 and the contact rod 94 are electrically connected through the sphere 97.

When an acceleration $a$ satisfying the following formula is applied to the system in which the sphere 97 was at rest, the sphere 97 is allowed to depart from the contact rod 94 to cut off the electrical conduction between the support ring 90 and the contact rod 94.

$$a > \frac{\{(m_1 + m_2)g - kx\}}{m_1} \cdot \frac{r}{\sqrt{R^2 - r^2}}$$

Here, r and R are the radii of the hole 91 of the support ring 90 and the sphere 97 respectively, $m_1$ and $m_2$ are the masses of the sphere 97 and the contact rod 94 respectively, $kx$ is the force which the spring 96 generates upward when the sphere 97 is at rest, i.e. $k$ is the force constant of the spring and $x$ is the displacement of the length of the spring, and $g$ is the gravitational acceleration.

In the embodiment as described above, the contact rod 94 pushes up the sphere 97 with a minute force when the sphere 97 is at rest. Therefore, the contact between the contact rod 94 and the sphere 97 becomes stable. Further, the response time from the moment when an acceleration is applied to the moment when the electrical conduction between the support ring 90 and the contact rod 94 is cut off can be easily and freely adjusted by the stroke of the resiliency of the spring. Further, the least value of the acceleration to be sensed can be freely set up by varying the radii of the sphere 97 and the hole 91 of the support ring 90.

FIG. 24 shows another embodiment in which a conductive spring 98 works also as the contact rod 94, eliminating the use of the contact rod 94. This embodiment provides similar effects as those of the foregoing embodiment.

The above embodiments provides the following advantages:

An acceleration in any three dimensional direction including the horizontal and the vertical directions can be sensed;

The response speed is high;

The structure is simple and can be made compact;

Since the sphere is pushed by a resilient member such as a spring, the contact between the sphere and the contact rod or the spring becomes stable.

FIG. 25 shows another embodiment. In the figure, an insulating bushing 100 is fixed at the open lower end of a housing 101. A ring-shaped support ring 102 is fixed on said bushing 100. The support ring 102 is formed of two conductors 103 and 103' adhered through an insulating plate 104 as is shown in FIG. 26. Here, said support ring 102 is provided with a hole 106, the upper inner periphery of which forms a circle. A conductive rigid sphere 105 is placed on said support ring 102. The diameter of said hole 106 in the support ring 102 is smaller than that of the sphere 105.

When the sphere 105 rests still on the support ring 102, the two conductors 103 and 103' forming the support ring 102 are electrically connected through the conductive sphere 105. When an acceleration $a$ expressed by the following formula is applied in a horizontal direction, the sphere 105 is moved to separate from the support ring 102 totally or except one portion to cut off the electrical conduction between the conductors 103 and 103'.

$$a > g \cdot r / \sqrt{R^2 - r^2}$$

Here, r and R are the radii of the hole 106 of the support ring 102 and the sphere 105, and $g$ is the gravitational acceleration.

In the conventional acceleration sensing devices, there exists some time lag from the application till the detection of an acceleration, whereas in the present embodiment there exists no time lag if one ignores the friction and the resistance of the air.

Here, for preventing a difference in the least acceleration to be detected especially in the direction of the insulating plate 104 of the support ring 102, the hole 106 should form a perfect circle and the upper surface of the support ring 102 should form a perfect plane. In manufacturing, however, it is often difficult to form the same circle with two conductors 103 and 103' sandwiching an insulating plate 104 and to form the upper surface in the same plane. If the insulating plate 104 projects from the upper surfaces of the conductors 103 and 103', the sphere 105 contacts only one of the conductors 103 and 103' when it is at rest. In such a case, it is apparent that the electrical conduction between the conductors 103 and 103' cannot be obtained even when no acceleration is applied. Thus, it may be suggested to shape the insulating plate 104 as is shown in FIG. 27, in which the plate 104 is provided with a cut-away 107 or tapered so that the inner top of the insulating plate 104 is located lower than the upper surface of the conductors 103 and 103'.

If the upper surface of the insulating plates 104 is lower than the upper surface of the conductors 103 and 103' as is shown in FIG. 28, when an acceleration is applied in the direction of the center line of the insulating plates 104, the sphere 105 rides on the two conductors 103 and 103' and the conduction is not cut off. Thus, a cut-away 108 may be formed in each of the two conductors 103 and 103' at the portion neighboring the insulating plates 104 as is shown in FIGS. 29 and 30 so that the sphere moved from the stable position in the direction of the insulators 104 touch an insulator 104 and one of the conductors 103 and 103'.

When an acceleration above a set value is applied to said system, the sphere 105 is allowed to depart from the support ring 102 wholly or except for one portion, collide with the housing 101, and repeat several bounces. If the acceleration is an impact, the sphere 105 will soon rest on the support ring 102. The acceleration can be sensed by electrically detecting the first cut-off of the electrical conduction between the conductors 103 and 103'. Here, the contact between the sphere and the conductors 103 and 103' is of very small pressure and may be electrically unstable. Further, the inclination of the housing greatly influences the sensed acceleration. An improvement of the electrical property and a reduction in the influences of the inclination of the housing can be provided by attracting the sphere downward by a spring, a permanent magnet, or an electromagnet.

What we claim is:

1. An acceleration sensing device comprising an electrically conductive horizontally disposed cylindrical non-magnetic support ring having a hole of predetermined radius, an insulating substrate supporting said support ring, an electrically conductive sphere having a radius larger than that of the hole of said support ring and placed on the upper inner periphery of said support ring, an electrically conductive contact member, and means supporting said contact member fixedly above said sphere and spaced therefrom when the sphere is normally on the support ring, said contact member having an axis substantially coaxial with the axis of the hole in said support ring, thereby establishing an electrical path between said support ring and said contact member when an acceleration having a horizontal component greater than a predetermined value is applied to the sphere causing it to pivot on the inner edge of said support ring to make contact with the contact member.

2. An acceleration sensing device comprising an electrically conductive cylindrical support ring having a hole of predetermined radius; an insulating substrate supporting said support ring; an electrically conductive sphere having a radius larger than that of the hole of said support ring and placed on the upper inner periphery of said support ring; an electrically conductive contact member; means supporting said contact member fixedly above said sphere and spaced therefrom when the sphere is normally on the support ring, said contact member having an axis substantially coaxial with the axis of the hole in said support ring; and an inner vessel-shaped casing tightly fixed at its opening surface to said insulating substrate to cover said support ring and said sphere, said inner casing having said contact member adjustably mounted thereon for setting the gap between said contact member and said sphere thereby establishing an electrical path between said support ring and said contact member when an acceleration above a predetermined value is applied to the sphere to make contact with the contact member.

3. An acceleration sensing device according to claim 2, in which said insulating substrate includes a printed circuit board.

4. An acceleration sensing device according to claim 2, in which said vessel-shaped casing is made of an electrically conductive material and electrically connected with said contact member.

5. An acceleration sensing device according to claim 4, in which said insulating substrate includes a printed circuit board formed with a conductive pattern, said support ring has at least one conductive terminal projecting downward as one electrode and soldered to the conductive pattern of said printed board, said vessel-shaped conductive casing has at least one conductive terminal projecting downward from the lower surface as another electrode and fixed to said printed substrate and interconnected with said conductive pattern by soldering, the conductive casing covering said support ring and said conductive sphere, and said electrically conductive contact member is disposed at a portion in said conductive casing located above said sphere, to thereby establish an electrical path between said electrodes upon occurrence of a contact between said sphere and said contact member.

6. An acceleration sensing device according to claim 4, in which said insulating substrate includes a printed circuit board provided with a conductive pattern, said support ring is provided with screw threads and fixed to the printed board and interconnected with said conductive pattern by electrically conductive screws as one electrode, said electrically conductive sphere is placed on the upper inner periphery of the hole of said support ring, said electrically conductive vessel-shaped casing is provided with screw threads in the lower surface and fixed to said printed board and interconnected with said conductive pattern by electrically conductive screws as another electrode, said conductive casing covering said support ring and said conductive sphere, and said electrically conductive contact member is supported by said conductive casing above said conductive sphere, to thereby establish an electrical path between said electrodes upon occurrence of a contact between said sphere and said contact member.

7. An acceleration sensing device according to claim 2, further comprising an outer casing accommodating the assembly including said inner casing, said insulating substrate and said sphere, said substrate being fixed to the bottom of said outer casing by screws, and a thermal insulator occupying the space between said inner and said outer casings.

8. An acceleration sensing device according to claim 2, further comprising an outer casing hermetically encapsulating the assembly including said inner casing, said insulating substrate and said sphere, the space between said inner and said outer casing being evacuated.

9. An acceleration sensing device according to claim 2, further comprising an outer casing hermetically encapsulating the assembly including said inner casing and a gas of high thermal insulation sealed in the space between said inner and said outer casings.

10. An acceleration sensing device according to claim 2, in which said support ring is formed of a conductive ring having an annular projection and a conductive support member having a hole for fitting said annular projection therein and fixing said ring on the insulating substrate.

11. An acceleration sensing device comprising a conductive cylindrical support ring having a hole, an insulating substrate supporting said support ring, a sphere having an radius larger than that of the hole of said support ring and placed on the upper inner periphery of said support ring, a resilient conductive plate means having at least one end connected with said support ring and a portion always brought into contact with the top of said sphere, and a conductive contact member fixedly supported above and separated from said sphere, said resilient conductive plate means being spaced from the contact member when the sphere is normally disposed on the support ring to thereby establish an electrical path between the support ring and the contact member by occurrence of a contact between said resilient conductive plate means and said contact member when an acceleration above a predetermined value is applied.

12. An acceleration sensing device according to claim 11, in which said resilient conductive plate means is an approximately U-shaped and electrically conductive resilient plate having one end connected with said support ring and the other end always brought into contact with the top of said sphere.

13. An acceleration sensing device according to claim 11, in which said resilient conductive plate means is formed of an electrically conductive ribbon, said ribbon having the two ends connected with said support ring and an intermediate portion in contact relationship with the top of said sphere.

14. An acceleration sensing device according to claim 12, in which said contact member comprises a body forming a screw, a housing provided at the bottom of said body and having an opening at its bottom, a conductive roller and a resilient means housed in said housing in stacked relation, and an axial member vertically slidably supported in the housing on which the roller is supported rotatably therealong, said resilient means urging the roller downward to be contactable with the top of said contact plate through the opening of the housing upon occurrence of a contact between the sphere and the contact plate.

15. An acceleration sensing device comprising a conductive cylindrical support ring having a hole, an insulating substrate supporting said support ring, a sphere having a radius larger than that of the hole of said support ring and placed on the upper inner periphery of said support ring, a conductive contact member fixedly supported above and separated from said sphere, conductive guide members vertically extending from and electrically connected with said support ring, a conductive contact plate mounted on said guide members between said sphere and said contact member slidably in the vertical direction, and resilient members mounted on said guide members respectively to urge the contact plate downward to thereby bring said contact plate into contact with the top of said sphere and to hold the contact plate spaced from said contact member when the sphere is normally disposed on the support ring, whereby an electrical path between said support ring and said contact member is established by occurrence of a contact between said contact plate and said contact member when an acceleration is above a predetermined value applied.

16. An acceleration sensing device comprising an electrically conductive cylindrical support ring having a hole, an insulating substrate supporting said support ring and having a first and a second conductive terminals, the first terminal being connected with the support ring, an electrically conductive sphere having a radius larger than that of the hole of said support ring and placed on the upper inner periphery of said support ring, and an electrically conductive contact member fixed on said substrate in the central portion of the hole of said support ring below the upper surface of said support ring and connected with said second conductive terminal, said sphere contacting the top of said contact member when the sphere is normally disposed on the ring to establish an electrical path between said terminals, and breaking contact with the contact member upon application of an acceleration above a predetermined value to open the electrical path.

17. An acceleration sensing device according to claim 16, further comprising a resilient means disposed above and in contact relationship with said sphere for applying a downward biasing force to said sphere.

18. An acceleration sensing device according to claim 16, further comprising a resilient means disposed along with the contact member for causing the contact member to be movable in the direction of the center line of said support ring and push up said sphere with a very small force.

19. An acceleration sensing device according to claim 16, in which said support ring includes a magnetic means for magnetically attracting the sphere to restrict the movement of the sphere.

20. An acceleration sensing device comprising a support ring having a hole and consisting of two semi-cylindrical electrical conductors and insulating plates interposed between said semi-cylindrical conductors to electrically isolate the conductors from each other, an electrically conductive sphere placed on the upper inner periphery of the hole of said support ring at its rest, and a housing for supporting said support ring and preventing the fall of said sphere, said sphere normally contacting both of the two semi-cylindrical conductors to establish an electrical path between said semi-cylindrical conductors and breaking the contact with either one of the semi-cylindrical conductors upon application of an acceleration above a predetermined value to open the electrical path.

21. An acceleration sensing device according to claim 20, in which each of the upper inner peripheries of said insulating plates has a tapered surface above the surface of the conductors so that the sphere cannot touch both of the semi-cylindrical conductors simultaneously if it is moved from the rest position.

22. An acceleration sensing device according to claim 20, in which at least one of said semi-cylindrical conductors has a cutaway at the portion facing the insulating plate and the top of the said insulating plate is lower than the upper surface of said conductors.

23. An acceleration sensing device comprising an electrically conductive cylindrical support ring having a hole of predetermined radius; an insulating substrate supporting said support ring; an electrically conductive sphere having a radius larger than that of the hole of said support ring and placed on the upper inner periphery of said support ring; an electrically conductive contact member; means supporting said contact member fixedly above said sphere and spaced therefrom when the sphere is normally on the support ring, said contact member having an axis substantially coaxial with the axis of the hole in said support ring; an electrically conductive plate shaped in a U-form and having at least one end fixed to said insulating substrate to partially cover said sphere and said support ring; and an electrically conductive screw means adjustably mounted on the top surface of said U-shaped conductive plate, said contact member being mounted on the bottom of said screw means above said sphere with a minute gap left between said contact member and said sphere thereby establishing an electrical path between said support ring and said contact member when an acceleration above a predetermined value is applied to the sphere to make contact with the contact member.

* * * * *